United States Patent [19]

Beardmore

[11] 4,122,689

[45] Oct. 31, 1978

[54] FLEXURE-PIVOT ASSEMBLIES AND METHODS OF MAKING THEM

[75] Inventor: Geoffrey Beardmore, Cheltenham, England

[73] Assignee: Smiths Industries Limited, London, England

[21] Appl. No.: 702,827

[22] Filed: Jul. 6, 1976

[30] Foreign Application Priority Data

Jul. 3, 1975 [GB] United Kingdom ............... 28155/75

[51] Int. Cl.$^2$ ........................ G01C 19/18; B23P 11/00
[52] U.S. Cl. .................................... 64/15 B; 64/27 B; 74/5 F
[58] Field of Search ................ 64/15 B, 27 B; 74/5 F, 74/5.7; 308/2 A

[56] References Cited

U.S. PATENT DOCUMENTS

| | | | |
|---|---|---|---|
| 1,640,670 | 8/1927 | Schaeffer | 64/27 B |
| 3,073,584 | 1/1963 | Troeger | 308/2 A |
| 3,124,342 | 3/1964 | Ormond | 64/27 B |
| 3,124,873 | 3/1964 | Troeger | 308/2 A |
| 3,181,851 | 5/1965 | Troeger | 308/2 A |
| 3,252,696 | 5/1966 | Friedel | 308/2 A |
| 3,277,555 | 10/1966 | Kutash | 308/2 A |
| 3,360,255 | 12/1967 | Ormond | 64/15 B |
| 3,722,296 | 3/1973 | Hurlburt | 308/2 A |
| 3,825,992 | 6/1974 | Troeger | 29/436 |

*Primary Examiner*—Benjamin W. Wyche
*Assistant Examiner*—R. C. Turner
*Attorney, Agent, or Firm*—Polloc, Vande Sande & Priddy

[57] ABSTRACT

A flexure-pivot for providing resilient restraint that opposes relative angular displacement between two members involves two flat springs, that are held at one end between pairs of pins carried by one member and at the other end between pairs of pins carried by the other member, the flat springs each having two parallel rib portions that are linked at one end and are interlaced with one another. In one form of flexure-pivot the unlinked end of both the rib portions of each spring is secured between a pair of pins carried by one member and the linked end of both the rib portions of each spring is secured between a pair of pins carried by the other member. In another form of flexure-pivot the pairs of pins carried by one member are axially aligned with the pairs of pins carried by the other member, when there is no relative displacement between the members, and the unlinked end of one of the rib portions is secured to one of the pairs of pins carried by one member and the unlinked end of the other one of the rib portions is secured to the axially aligned pair of pins carried by the other member, so that there is a resilient interconnection between the axially aligned pairs of pins. In both forms of flexure-pivot, further pins are mounted with one or other of the members to limit relative angular displacement between the two members by engagement with pairs of pins mounted on an opposite member. Manufacture of both forms of flexure-pivot is initially the same and is carried out by inserting the ends of four pairs of pins in holes in one member, securing each end of the two flat springs between opposite pairs of pins, inserting the other ends of the four pairs of pins in holes in the other member, and brazing the assembly formed to secure the springs to the pins and the pins to the members. One form of flexure-pivot is subsequently formed by cutting two adjacent pairs of pins close to one member and the other two adjacent pairs of pins close to the other member. The other form of flexure-pivot however is formed by cutting through two adjacent pairs of pins at points between the rib portions and cutting through the other two adjacent pairs of pins at one point close to one member and at another point close to the other member.

9 Claims, 8 Drawing Figures

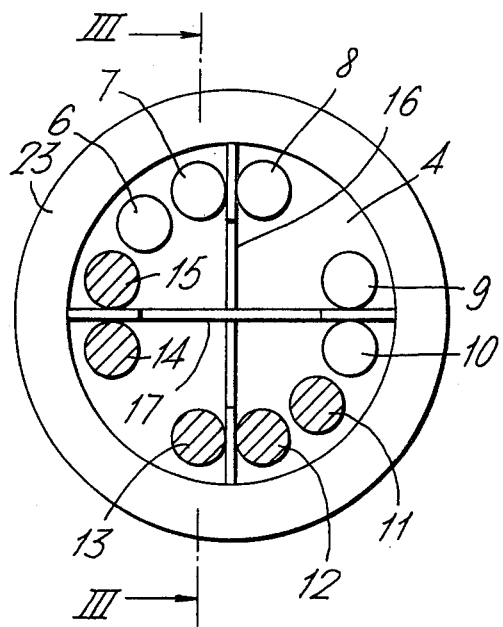
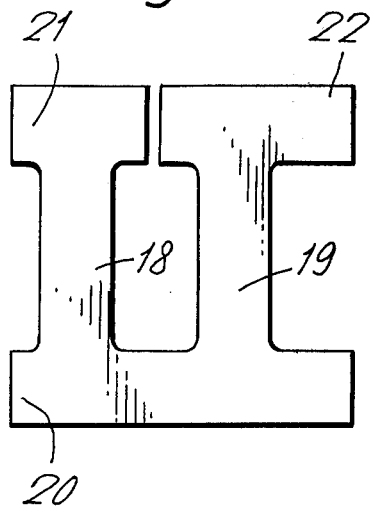
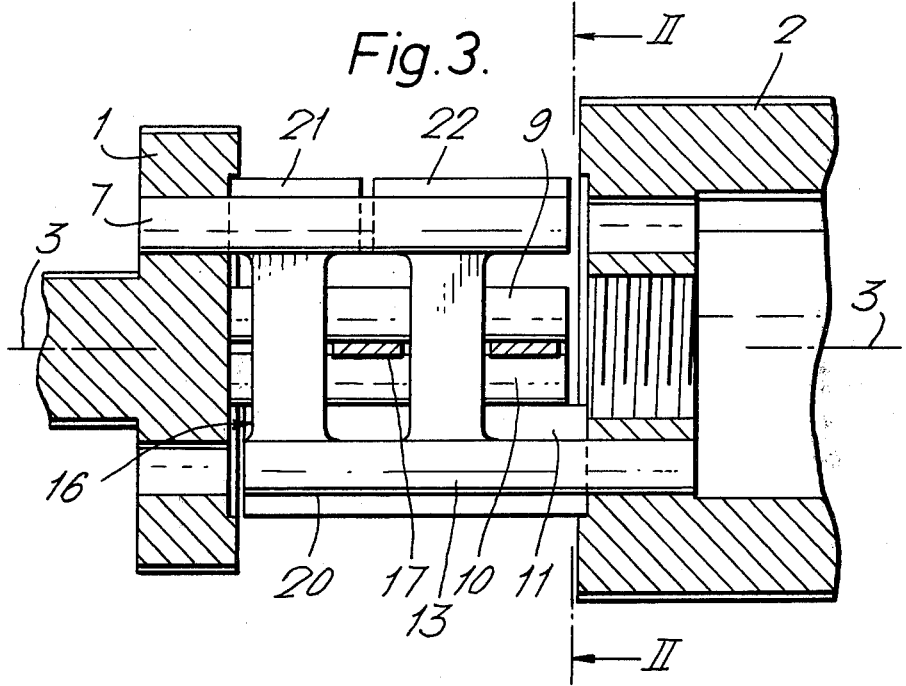

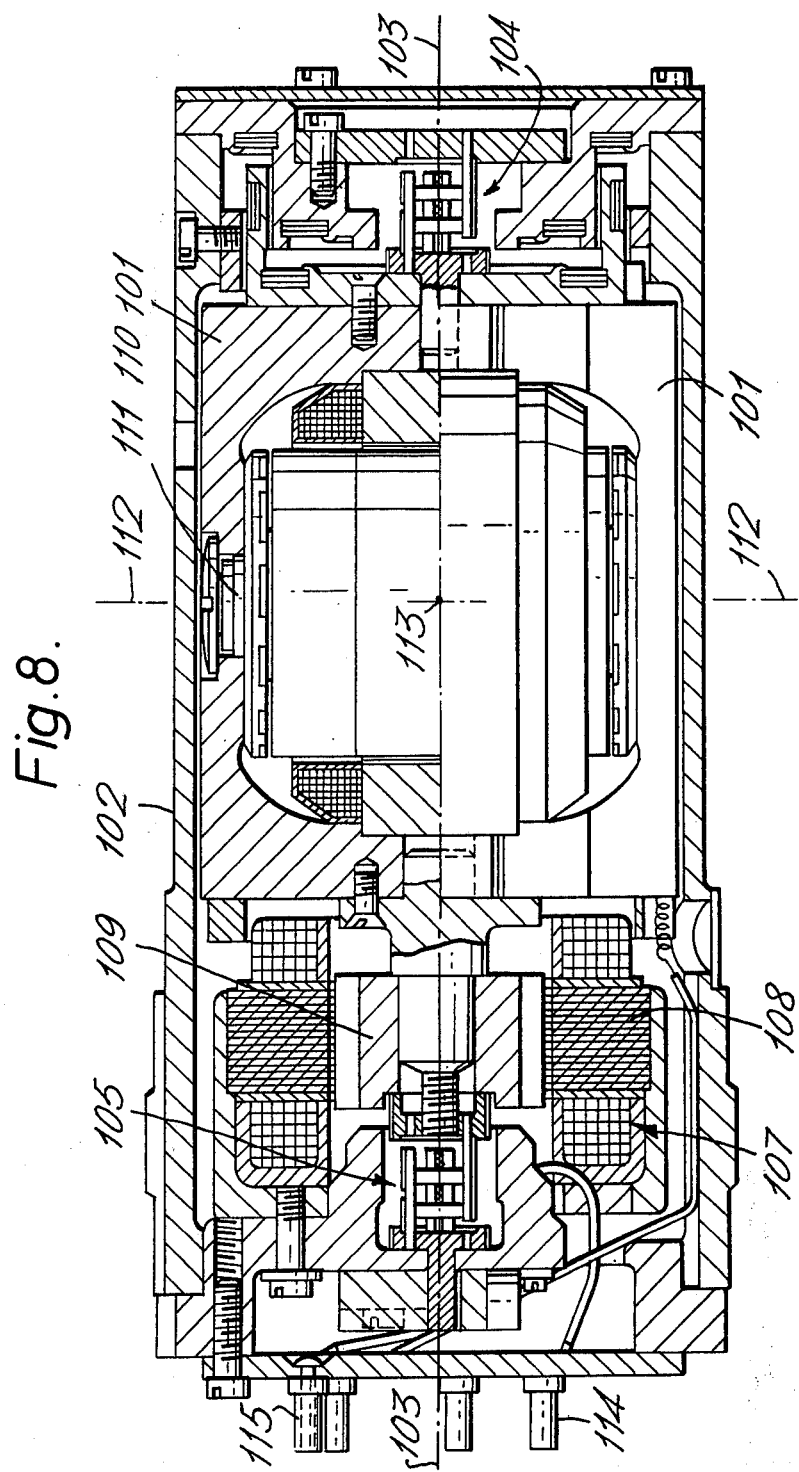

FLEXURE-PIVOT ASSEMBLIES AND METHODS OF MAKING THEM

This invention relates to flexure-pivot assemblies and to methods of making them.

The invention is concerned with the provision of a pivot of simple construction that permits frictionless angular displacement of limited extent between two members. The invention is especially applicable in low-torque applications, for example in the gimbal mounting of a gyroscope.

Flexure-pivot assemblies of the above kind have been described in U.K. patent specifications Nos. 915918, 954464 and 984146. In these two flat-blade springs are each connected at one end to a first rotatable sleeve and at the other end to a second rotatable sleeve coaxial with the first so as to provide resilient restraint opposing relative angular displacement between the two sleeves. One disadvantage of this form of pivot assembly is that any debris accumulating between the sleeves can cause friction between the members and damage to the assembly. Furthermore there is the fundamental difficulty of manufacturing the assembly and in particular of securing the springs accurately to the two sleeves.

It is an object of the present invention to provide a form of flexure-pivot assembly that can be used to overcome problems experienced with the known forms and in particular is capable of simpler manufacture.

According to one aspect of the present invention there is provided a flexure-pivot assembly that includes two mounting members and wherein the said two mounting members are resiliently interconnected by means of a plurality of flat springs that are each held at one end between two pins mounted with one of said mounting members and at the other end between two pins mounted with the other of said mounting members.

By use of pins to hold the springs it is possible to achieve a simple construction of assembly. More particularly, by holding the ends of the springs between pairs of pins the location and effective length of each spring in the assembly can be precisely defined. Furthermore with the assembly of the present invention there is no requirement for component parts of other than simple form, and these parts may be to a substantial extent all of the same material avoiding problems that might otherwise arise from differential thermal expansion. An open construction that reduces the likelihood of accumulation of dirt or debris within the assembly during manufacture or use, can also be readily achieved.

According to another aspect of the present invention there is provided a method of manufacturing a flexurepivot assembly including the steps of securing four pairs of pins at one end to a first mounting member such that the two pins of each pair are close to one another and project from said first mounting member at a location opposite that of another of said pairs of pins, securing two flat springs to the pins with the two ends of each spring inserted between the pins of opposite pairs such that the springs cross one another, securing the other end of each pin to a second mounting member, cutting through each said pin at a selected position along its length such that thereby the interconnection remaining between the two mounting members via said pins is a resilient interconnection through the said two springs.

The method of manufacture of the present invention, has the advantage of simplicity. Only components of simple form need be involved, and the machining of the assembly can be limited to the relatively simple severing of the pins.

The same manufacturing steps and components can be utilized in the production of assemblies having different characteristics. The characteristics of the resulting assembly can be determined simply by the number and location of cuts made.

Two forms of flexure-pivot assembly in accordance with the present invention, and methods of their manufacture, will now be described, by way of example, with reference to the accompanying drawings, in which:

FIG. 2 is a sectional end view of the flexure-pivot assembly of FIG. 1;

FIG. 3 is a sectional view to a reduced scale of the flexure-pivot assembly of FIG. 1, the section of this view being taken on the line III-III of FIG. 2 and the section of FIG. 2 being taken on the line II-II of FIG. 3;

FIG. 4 shows the configuration of one of two identical springs used in the flexure-pivot assembly of FIG. 1;

FIG. 8 is a sectional view of a rate gyroscope including flexure-pivot assemblies of either of the two forms.

Both forms of flexure-pivot assembly to be described are intended for use in the mounting of the gimbal frame of a rate gyroscope. More particularly, the flexure-pivot assembly is required in this context to enable the gimbal frame to be angularly displaced relative to the casing of the gyroscope throughout a limited angular range about a central datum position and to provide throughout the range a linear restoring torque. Although the two forms of flexure-pivot assembly to be described are of more general application and not limited to the context of rate gyroscopes, the description of them will be related for convenience to their use in this specific context.

Figure 1:
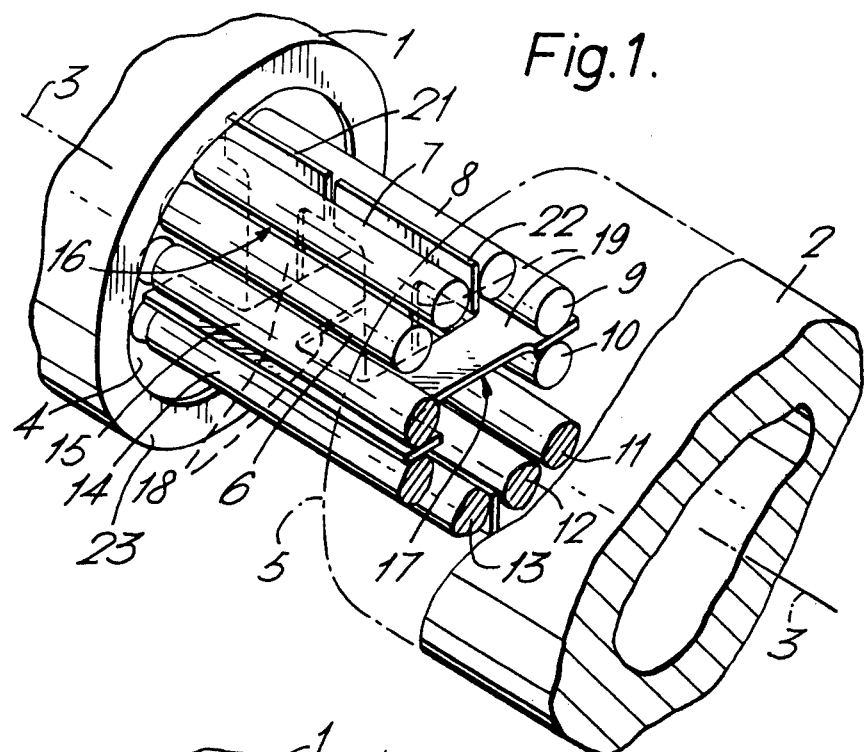
FIG. 1 is illustrative of a first of the two forms of flexure-pivot assembly.

Referring to FIGS. 1 to 3, the flexure-pivot assembly is provided between a cylindrical stub axle 1 that projects from the gimbal frame (not shown) of the gyroscope and a mounting block 2 that is provided on the gyroscope casing (not shown). The axle 1 and block 2 are aligned with one another on a longitudinal axis 3 of the assembly and with their opposed end faces 4 and 5 parallel to one another. Five pins 6 to 10 are mounted concentrically on the end face 4 of the axle 1 to project parallel to the axis 3 towards the block 2, and similarly five pins 11 to 15 are mounted concentrically on the end face 5 to project parallel to the axis 3 towards the face 4 of the axle 1. The pins 7 and 8 are positioned close to one another, as are the two pins 9 and 10, with the two pairs of pins spaced by 90° from one another about the axis 3. The pins 12 and 13 and the pins 14 and 15 are similarly located in pairs so that the pair of pins 7 and 8 is diametrically opposed by the pair of pins 12 and 13 and the pair of pins 9 and 10 is diametrically opposed by the pair of pins 14 and 15 in the assembly.

Two spring blades 16 and 17 are secured to the diametrically-opposed pairs of pins, thereby interconnecting the stub axle 1 with the mounting block 2 resiliently.

The planes of the two blades 16 and 17 intersect one another at right angles on the axis 3 and mid-way along the blade length. Each of the blades 16 and 17, which are both of the form shown in FIG. 4, includes two parallel rib portions 18 and 19 that are linked at one end by a portion 20 and at the other end carry aligned portions 21 and 22 respectively which are separated from one another by a small gap. The end portions 21 and 22 of the blade 16 are located between the pair of pins 7 and 8, and are retained there by a brazed joint, whereas the end portion 20 of that blade is located between, and brazed to, the pair of pins 12 and 13. In a similar manner, the end portions 21 and 22 of the blade 17 are retained between the pairs of pins 9 and 10, and the end portion 20 of that blade is retained between the pair of pins 14 and 15.

The rib portions 18 and 19 of the two blades 16 and 17 are interlaced with one another such that the planes of the two blades intersect one another along the axis 3. This establishes substantial stiffness of intercoupling between the axle 1 and block 2 except about the axis 3, relative angular displacement between the two members about this axis being opposed by a substantially linear torque exerted by the spring blades 16 and 17.

The two pins 6 and 11 act to prevent excessive angular displacement between the axle 1 and block 2. The normal displacement experienced is, for example, of the order of two degrees in either sense about the axis 3, and the stops act to prevent displacement in excess of five degrees. When the stub axle 1 is angularly displaced by this latter amount in one direction with respect to the mounting block 2, the pin 6 projecting from the stub axle 1, comes into contact with the pin 15 on mounting block 2. However, when the stub axle 1 is angularly displaced by the same amount in the opposite direction, the pin 11 projecting from the block 2, comes into contact with the pin 10 projecting from the stub axle 1.

The entire flexure-pivot assembly is made of maraging steel, the stub axle 1, the mounting block 2 and the pins 6 to 15 being nickel-plated by an electroless process. Since the entire assembly is for practical purposes of one material only, there is substantially no instability in the pivot that might otherwise arise from differential thermal expansion of the component parts.

The blades 16 and 17 are formed by photoetching (so as to ensure burr-free edges) with the rib portions 18 and 19 of the blades 16 and 17 etched from the blank to extend parallel to the direction of the grain of the material. The blades are not plated, thereby avoiding any danger of a bimetallic effect on the blade operation that would otherwise arise from globules of the plating material which would form on the blade surfaces during brazing. Use of maraging steel for the blades 16 and 17 enables the nickel plating on the pins to wet the unplated material of the blades when the brazed joint is being formed.

Figure 5:
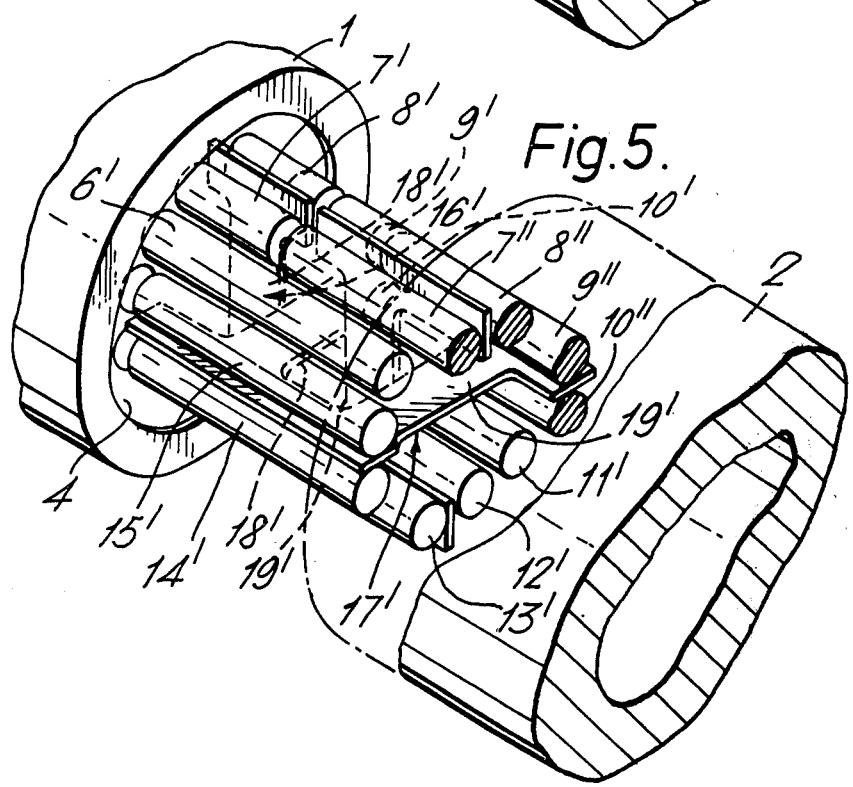
FIG. 5 is illustrative of the second form of flexure-pivot assembly.
Figure 6:
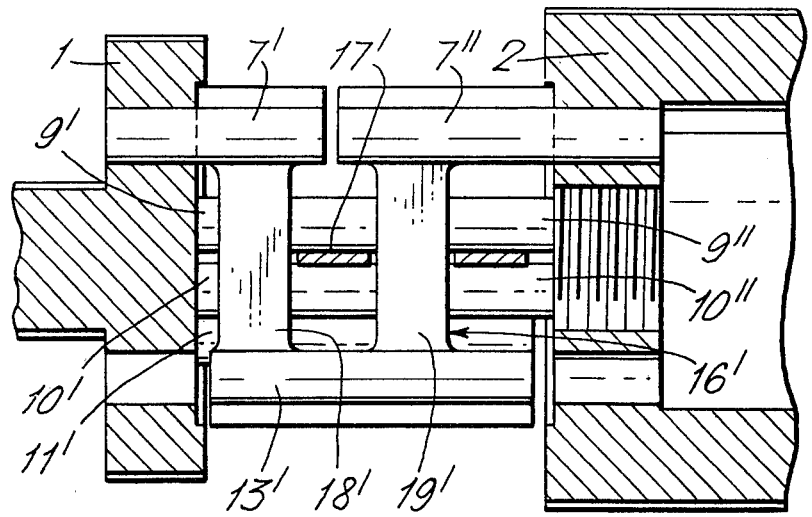
FIG. 6 is a sectional view corresponding to that of FIG. 3, of the second form of flexure-pivot assembly.

The second form of flexure-pivot assembly is shown in FIGS. 5 and 6. This flexure-pivot assembly is formed from the same basic components as the pivot shown in FIG. 1, but has a torsional resilience that is only one half of that of the pivot shown in FIG. 1. The resilience between the stub axle 1 and the mounting block 2 is in this case established via the two ribs of each blade acting in series with one another, rather than in parallel as with the assembly of FIG. 1.

Referring to FIGS. 5 and 6, one end of the rib portion 18′ of a U-shaped blade 16′ is retained between a pair of pins 7′ and 8′ that project from the end face 4 of the axle 1 whereas the end of the rib portion 19′ of that blade is retained between a pair of pins 7″ and 8″ that project from the face 5 of the mounting block 2 and are normally aligned with the pins 7′ and 8′. The end portion of the blade 16′ interconnecting the rib portions 18′ and 19′ is sandwiched between the two pins 12′ and 13′ that are separated from both the axle 1 and the block 2. Similarly the U-shaped blade 17′ is retained at one end of its rib portion 18′ between a pair of pins 9′ and 10′ projecting from the end 4 of the axle 1, and at one end of its rib portion 19′ between a pair of pins 9″ and 10″ projecting from the end 5 of the block 2, the interconnecting portion of the blade 17′ being sandwiched between two pins 14′ and 15′ separated from the axle 1 and block 2. The blades 16′ and 17′ are interlaced with one another with their planes intersecting on the axis 3.

Two pins 6′ and 11′, both mounted on the axle 1, act as torsion stops. Excessive angular displacement in one direction brings the pin 7″ projecting from the block 2 into contact with the pin 6′ projecting from the axle 1, whereas excessive angular displacement in the opposite direction brings the pin 10″, projecting from the block 2, into contact with the pin 11′ projecting from the axle 1.

The methods of manufacture of the flexure-pivot assemblies of FIGS. 1 to 3 and FIGS. 5 and 6 will now be described initially with particular reference to FIG. 7 as applied to manufacture of the assembly of FIGS. 1 to 3.

Figure 7:
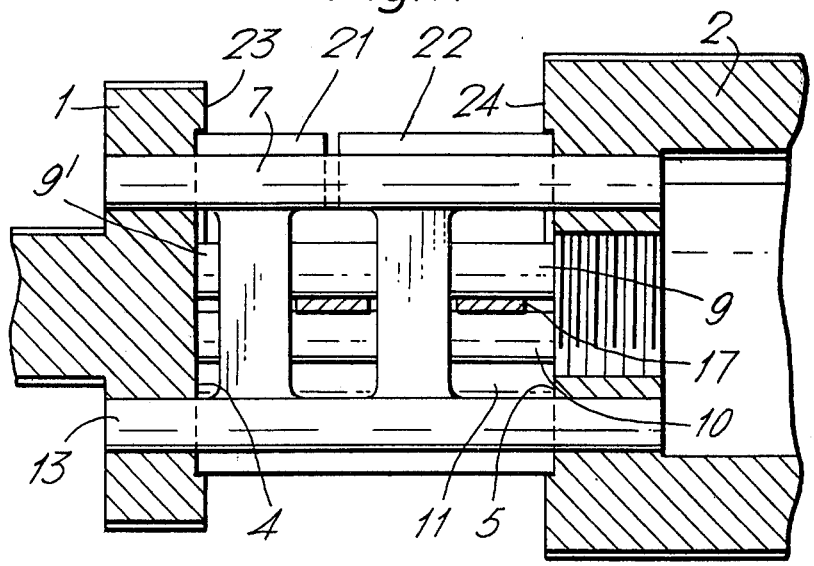
FIG. 7 is a sectional view of an assembly that is produced at a preliminary stage in the manufacture of each of the two forms of flexure-pivot assembly, the section taken corresponding in the finished product to that of FIG. 3 or FIG. 6.

Referring to FIG. 7, one end of each of the pins 6 to 15 is inserted, as a push fit, in the ten holes provided in the face 4 of the stub axle 1. The steel blade 16 is inserted between the pair of pins 7 and 8 and the pair of pins 12 and 13, and the steel blade 17 is inserted between the pair of pins 9 and 10 and the pair of pins 14 and 15 such that the two blades 16 and 17 are interlaced and their planes intersect one another at right angles. The other end of each pin is inserted in a corresponding hole in the face 5 of the mounting block 2. Location of the blades 16 and 17 in a central position is aided by raised rims 23 and 24 around the circumference of the faces 4 and 5.

In order to secure the pins 6 to 15 to the axle 1 and block 2, and the blades 16 and 17 to the pins, all areas of contact of the pins with the axle and the block, and of the pins with the blades are coated with brazing material. The complete assembly is then subjected to brazing in a vacuum; the components may be held firmly in appropriate assembly beforehand by use of a bonding material that evaporates during the brazing. The geometry of the blade location arrangement enables an accurately-reproducible brazing meniscus to be produced so that the same length of the blade is free for flexing in each case. No elaborate jig is required to support the components of the pivot during brazing, since they are virtually self-locating. During brazing, the assembly is supported in a vertical position in a furnace and the temperature raised slowly under vacuum to 930° C. The furnace remains at this temperature for two minutes and is then allowed to cool slowly under vacuum to 800° C. The assembly is then quickly cooled to room temperature, and is then hardened by raising the temperature of the furnace slowly under vacuum to 480° C. This temperature is maintained for three hours and the assembly is then cooled rapidly again to room temperature.

Since the flexure-pivot assembly is made entirely of one material, namely maraging steel, heat treatment of the pivot assembly may be effected without distortion of the assembly which would otherwise arise from differential thermal expansion. The heat treatment hardens the blades, which helps reduce mechanical hysteresis on subsequent flexing. At this stage of manufacture, the pivot is in the form of a rigid assembly of hard material and may be easily handled and machined without damage, and as such is in a form common to the methods of manufacture of both the forms of pivot assembly. The two different configurations of pivot assembly are produced from this form by cutting the pins and blades at different points. The cutting is preferably effected by a spark erosion process so as to avoid stressing the assembly and producing burrs.

The flexure-pivot of FIGS. 1 to 3 is produced from the rigid assembly by cuts made close to the face 4 and close to the face 5. The cuts close to the face 4 sever the pins 11 to 15 from the stub axle 1 together with those portions of the blades 16 and 17 that are retained between the pins 12 and 13 and also those portions retained between the pins 14 and 15. The cuts close to the face 5 sever the pins 6 to 10 from the block 2 together with those portions of the blades 16 and 17 retained between the pins 7 and 8, those portions retained between the pins 9 and 10, and thereby complete formation of the structure as shown in FIGS. 1 to 3.

The flexure-pivot of FIGS. 5 and 6 is produced from the rigid assembly on the other hand, by cuts made close to the face 4, close to the face 5 and between the rib portions of the blades. The cuts close to the faces 4 and 5 sever the pins 12 to 15 and also the portion of the blades 16 and 17 retained between the pins 14 and 15, from both the axle 1 and block 2. The cuts close to the face 5 also sever the pins 6 and 11 from the block 2, whereas those made between the rib portions sever the pins 7 to 10 into portions 7' to 10' carried with the axle 1 and portions 7" to 10" carried by the block 2, to complete formation of the structure as shown in FIGS. 5 and 6.

The manner in which either of the two forms of flexure-pivot assembly may be incorporated in a rate gyroscope is illustrated in FIG. 8. The rate gyroscope of FIG. 8 utilizes two flexure-pivot assemblies of either form.

Referring to FIG. 8, the gimbal structure 101 of the rate gyroscope is rotatably mounted within a cylindrical casing 102 for angular displacement about the longitudinal axis 103 of the casing 102. The structure 101 is mounted by means of one flexure-pivot 104 at one end of the casing 102 and by means of another flexure-pivot 105 at the other end, the flexure-pivots 104 and 105 providing a resilient restraint opposing angular displacement of the structure 101 about the axis 103. An inductive transducer or pickoff 107 that comprises a ferromagnetic stator 108 carried by the casing 102 and a ferromagnetic rotor 109 carried by the structure 101, is arranged to be excited with alternating electric current so as to derive in the stator 108 a signal dependent upon any angular displacement of the structure 101 about the axis 103.

An electrically-driven rotor 110 of the rate gyroscope is carried by the gimbal structure 101, being rotatably-mounted on an 'H' configuration hydrodynamic gas-lubricated bearing assembly 111 that is secured to the structure 101 with its longitudinal axis 112 perpendicular to the axis 103. The rotor 110 is in operation energized to cause it to rotate about the axis 112 (the spin axis of the gyroscope), and in these circumstances any angular movement of the casing 102 about an axis 113, which axis being perpendicular to the two axes 103 and 112 constitutes the input axis of the rate gyroscope, tends to process the gimbal structure 101 about the axis 103 (the precession axis of the gyroscope). Procession in this way is restrained resiliently by the flexure-pivots 104 and 105 so that the resultant angular displacement of the gimbal structure 101 about the precession axis 103 is in accordance with the angular velocity, or rate, of the casing 102 about the input axis 113. The pick-off 107 derives an electric alternating-current signal in accordance with the displacement, and this signal as applied to appear between output terminals 114 and 115 mounted externally of the casing 102, provides a measure of the input rate.

We claim:

1. A flexure-pivot comprising first and second mounting members; first and second pairs of pins; means connecting said first and second pairs of pins to only said first mounting member; third and fourth pairs of pins; means connecting said third and fourth pairs of pins to only said second mounting member; a first flat spring for resiliently interconnecting the first and third pairs of pins; means mounting one end of said first spring between the pins of said first pair of pins; means mounting the other end of said first spring between the pins of said third pair of pins; a second flat spring for resiliently interconnecting the second and fourth pairs of pins; means mounting one end of said second spring between the pins of said second pair of pins; and means mounting the other end of said second spring between the pins of said fourth pair of pins so that the first and second mounting members are resiliently interconnected for relative angular displacement via said first and second springs.

2. A flexure-pivot according to claim 1 wherein the planes of said first and second springs intersect one another at right angles and midway along the lengths of the springs.

3. A flexure-pivot according to claim 1 wherein said first and second springs have two parallel rib portions having a linked end and an unlinked end and wherein said rib portions of the said first and second springs are interlaced.

4. A flexure-pivot according to claim 1 having a further pin; means connecting said further pin to only said first mounting member to extend between said first and fourth pairs of pins; another pin; means connecting said other pin to only said second mounting member to extend between said second and third pairs of pins so that relative angular displacement between the first and second mounting members is limited in one direction by engagement of said further pin with said fourth pair of pins and in the other direction by engagement of said other pin with said second pair of pins.

5. A flexure-pivot according to claim 1 in which said mounting members, pins and springs are made of maraging steel.

6. A flexure-pivot comprising first and second mounting members, first and second pairs of pins; means connecting said first and second pairs of pins to only said first mounting member; third and fourth pairs of pins; means connecting said third and fourth pairs of pins to only said second mounting member; a first and second flat spring, each comprising two parallel rib portions; means mounting one end of both said rib portions of said first spring between the pins of said first pair of pins; means mounting the other end of both said rib portions of said first spring between the pins of said third pair of pins, so as to resiliently interconnect said first and third pairs of pins; means mounting one end of both said rib portions of said second spring between the pins of said second pair of pins; means mounting the other end of both said rib portions of said second spring between the pins of said fourth pair of pins, one of said rib portions of said second spring extending between said rib portions of said first spring and so as to resiliently interconnect said first and second mounting members.

7. A flexure-pivot comprising first and second mounting members; first and second pairs of pins; means connecting said first and second pairs of pins to only said first mounting member; third and fourth pairs of pins, means connecting said third and fourth pairs of pins to only said second mounting member, said first and third, and said second and fourth pairs of pins being axially aligned; a first and second flat spring each comprising two parallel rib portions and an end portion, said end portion of each spring linking the said two rib portions of said spring at one end; means mounting another end of one of said rib portions of said first spring between the pins of said first pair of pins; means mounting another end of the other of said rib portions of said spring between the pins of said third pair of pins so as to resiliently interconnect said first and third pairs of pins; means mounting another end of one of said rib portions of said second spring between the pins of said second pair of pins; and means mounting another end of the other rib portion of said second spring between the pins of said fourth pair of pins so as to resiliently interconnect said second and fourth pairs of pins and thereby resiliently interconnect said first and second mounting members through said first and second springs.

8. A flexure-pivot according to claim 7 and having a fifth pair of pins; means mounting said end portion of said first spring between the pins of said fifth pair of pins; a sixth pair of pins; and means mounting said end portion of said second spring between the pins of said sixth pair of pins so as to restrict flexing of said end portions.

9. A flexure-pivot according to claim 8 having two further pins of length greater than that of the pins of said first and second pairs of pins, and means connecting said further pins to only said first mounting member to extend parallel to and on either side of said third and fourth pairs of pins so as to limit relative angular displacement between said first and second mounting members.

* * * * *